United States Patent
Hayman et al.

(10) Patent No.: US 12,008,141 B2
(45) Date of Patent: Jun. 11, 2024

(54) PRIVACY PRESERVING SYNTHETIC STRING GENERATION USING RECURRENT NEURAL NETWORKS

(71) Applicant: Intuit Inc., Mountain View, CA (US)

(72) Inventors: Liron Hayman, Hod Hasharon (IL); Shlomi Medalion, Lod (IL)

(73) Assignee: Intuit Inc., Mountain View, CA (US)

( * ) Notice: Subject to any disclaimer, the term of this patent is extended or adjusted under 35 U.S.C. 154(b) by 1072 days.

(21) Appl. No.: 16/836,528

(22) Filed: Mar. 31, 2020

(65) Prior Publication Data

US 2021/0303726 A1    Sep. 30, 2021

(51) Int. Cl.
*G06F 21/62* (2013.01)
*G06N 3/084* (2023.01)
*G06N 20/00* (2019.01)

(52) U.S. Cl.
CPC ......... *G06F 21/6254* (2013.01); *G06N 3/084* (2013.01); *G06N 20/00* (2019.01)

(58) Field of Classification Search
CPC ...... G06F 21/6254; G06N 3/08; G06N 3/044; G06N 20/00; G06N 3/084
See application file for complete search history.

(56) References Cited

U.S. PATENT DOCUMENTS

| | | | | |
|---|---|---|---|---|
| 2009/0182728 A1* | 7/2009 | Anderson | ............. | G06F 16/113 707/999.005 |
| 2014/0201847 A1* | 7/2014 | Ito | ...................... | G06F 21/6254 726/26 |
| 2017/0097996 A1* | 4/2017 | Gullett | .................. | G06F 16/951 |
| 2020/0012811 A1* | 1/2020 | Walters | .................. | G06N 20/00 |
| 2020/0312301 A1* | 10/2020 | Polovets | ................ | G06N 3/084 |
| 2021/0097201 A1* | 4/2021 | Wasicek | ............. | G06F 21/6254 |

OTHER PUBLICATIONS

Karpathy, "Multi-Layer Recurrent Neural Networks (LSTM, GRU, RNN) for Character-Level Language Models in Torch", https://github.com/karpathy/char-rnn, Apr. 30, 2016, 5 pages.
Karpathy, "The UnreasonableEffectiveness of Recurrent Neural Networks", https://karpathy.github.io/2015/05/21/rnneffectiveness/, May 21, 2015, 29 pages.

\* cited by examiner

*Primary Examiner* — Abdullah Al Kawsar
*Assistant Examiner* — Tewodros E Mengistu
(74) *Attorney, Agent, or Firm* — Lathrop GPM LLP

(57) ABSTRACT

A method for privacy preserving synthetic string generation using recurrent neural networks includes receiving input data that includes a plurality of strings with private information. A neural network model is trained using the plurality of strings. The neural network model includes a recurrent neural network (RNN). An anonymous string is generated with the neural network model after training the neural network model with the plurality of strings from the input data. The anonymous string is validated to preclude the private information from the anonymous string. Anonymous data is transmitted that includes the anonymous string and precludes the private information in response to a request for the anonymous data.

12 Claims, 7 Drawing Sheets

Header 302

Sidebar 304
- Withdrawal @ DRS. ELIAS & OAK 63 EAST THIRD STREET APOPKA FLUS Trace #436500441143
- Transfer to Chase
- Deposit from Personal Checkings  308
- Withdrawal to Wardrobe XXXXX0238
- Paper Payment to CPM Landscaping
- Rent Savings - Deposit from Chec
- Rent Savings - Withdrawal to Ren
- Deposit from Checking XXXXX0077
- POS Withdrawal - FRED MEYER 122POS Withdrawal - FRED MEYER 122 SEATTLE WAUS - Card Ending In 0348
- Debit Card Purchase - DAIRY BAR
- ACH Deposit DFAS-CLEVELAND ALLOTMENT 01436401O022353
- Interest_Credit
- DIVIDEND Footer 306

*Figure 3A*

Header 302

- mop purchase transfer to checks checkings
- goon store des:don to in deposit
- checkings savings
- purconur to co stores card purchase - ach sernet tre streelder to hoost starget ton coffeler to checkener to inc
- gore debit-10789
- apmt statellen transfer to st transfer transfer thorized on 09-21
- deposit coffeer to check
- wa card payment 09/20
- richase thees transfer to hount
- purchase transfer to prone ser to hourtaton to seatt
- he to service ser transfer to checking to coper to co checking
- fee,ach sea transfer to heekice atm,chece,wal,atm withdrawal to home pral
- purchase to home transfer transfer to hoorte

328

Sidebar 324

Footer 306

PRIVACY PRESERVING SYNTHETIC STRING GENERATION USING RECURRENT NEURAL NETWORKS

BACKGROUND

During various phases of software, such as testing, data is used. However, the data may include private information that can be used to identify particular users or account holders. A challenge is to automatically provide anonymous data that retains the underlying structure of the original data but does not include private information.

SUMMARY

In general, in one or more aspects, the disclosure relates to a method that includes receiving input data that includes a plurality of strings with private information. A neural network model is trained using the plurality of strings. The neural network model includes a recurrent neural network (RNN). An anonymous string is generated with the neural network model after training the neural network model with the plurality of strings from the input data. The anonymous string is validated to preclude the private information from the anonymous string. Anonymous data is transmitted that includes the anonymous string and precludes the private information in response to a request for the anonymous data.

In general, in one or more aspects, the disclosure relates to a system that includes a processor and a memory coupled to the processor. The memory includes an application that executes on the processor and uses the memory. Input data is received that includes a plurality of strings with private information. A neural network model is trained using the plurality of strings. The neural network model includes a recurrent neural network (RNN). An anonymous string is generated with the neural network model after training the neural network model with the plurality of strings from the input data. The anonymous string is validated to preclude the private information from the anonymous string. Anonymous data is transmitted that includes the anonymous string and precludes the private information in response to a request for the anonymous data.

In general, in one or more aspects, the disclosure relates to a set of one or more non-transitory computer readable mediums with computer readable program code for receiving input data that includes a plurality of strings with private information. A neural network model is trained using the plurality of strings. The neural network model includes a recurrent neural network (RNN). An anonymous string is generated with the neural network model after training the neural network model with the plurality of strings from the input data. The anonymous string is validated to preclude the private information from the anonymous string. Anonymous data is transmitted that includes the anonymous string and precludes the private information in response to a request for the anonymous data.

Other aspects of the invention will be apparent from the following description and the appended claims.

BRIEF DESCRIPTION OF DRAWINGS

FIG. 3A and FIG. 3B show examples in accordance with disclosed embodiments.

DETAILED DESCRIPTION

Figure 1A:
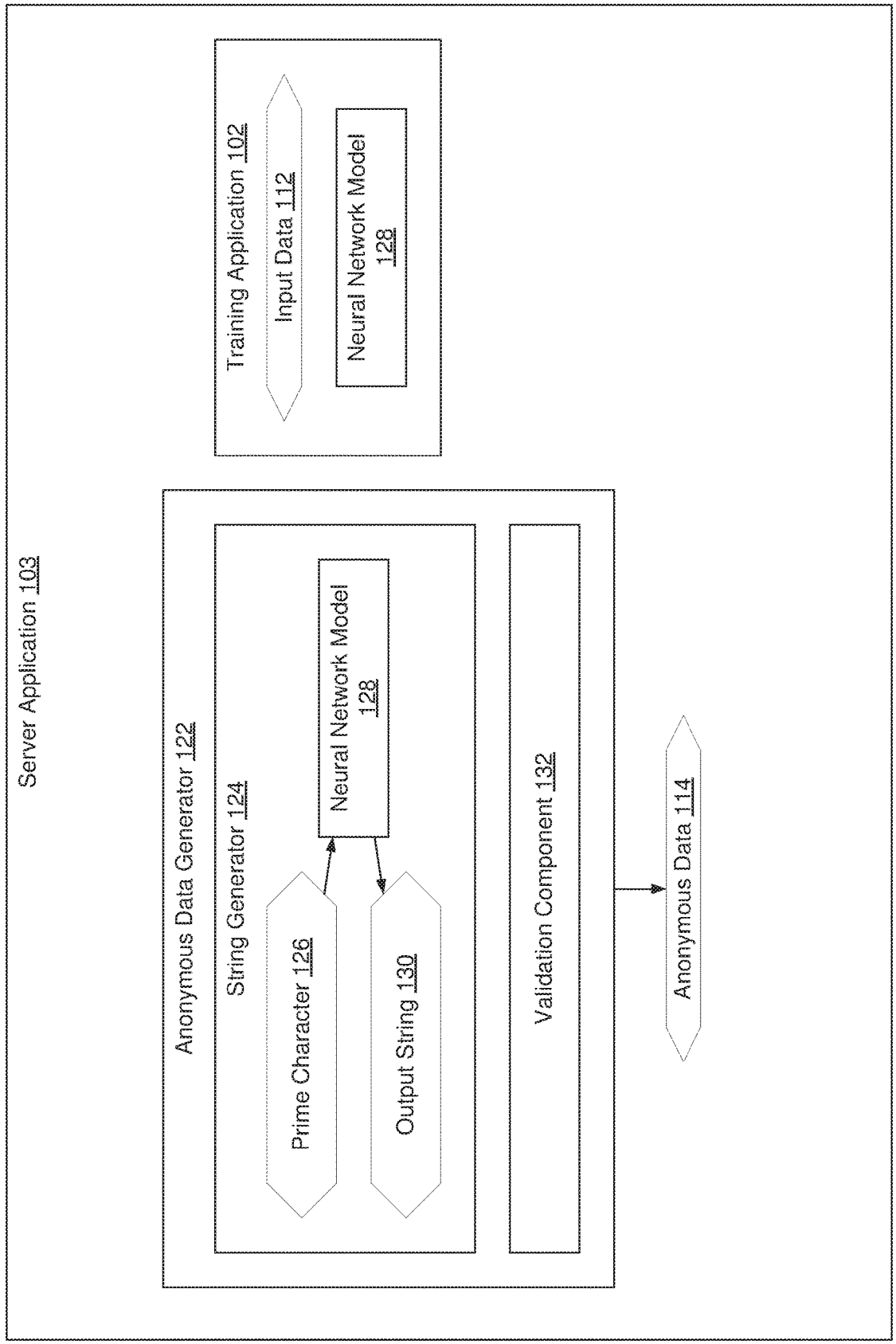
FIG. 1A, FIG. 1B, and FIG. 1C show diagrams of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure preserve privacy by generating, from input data, anonymous data that precludes private information. The anonymous data is generated by training a character-based recurrent neural network (RNN) on the original data. The trained RNN is then used to generate sequences learned from the underlying structure of the original data. The anonymous data resembles the underlying data but is permutated sufficiently so that the new data preserves user privacy and excludes private information.

Private information is information that is unique to a user, which may be used to identify a user or account holder. For example, transaction records may include private information identifying payees and locations, from which a user or account holder may be identified. As another example, a specific transaction number that appears in the input data may also be private information as it is real information that is unique to a particular user.

Figure 1B:
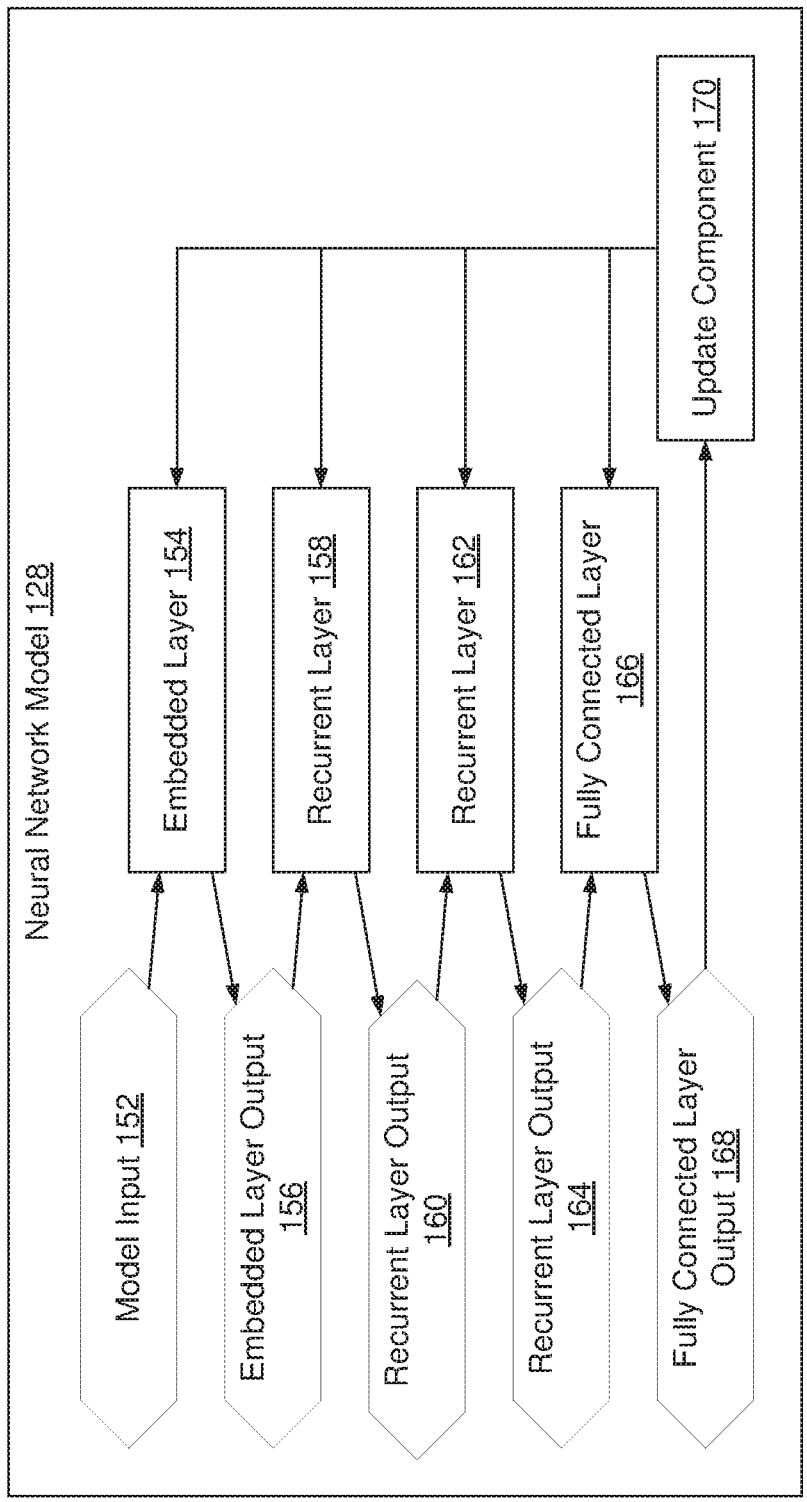
Figure 1C:
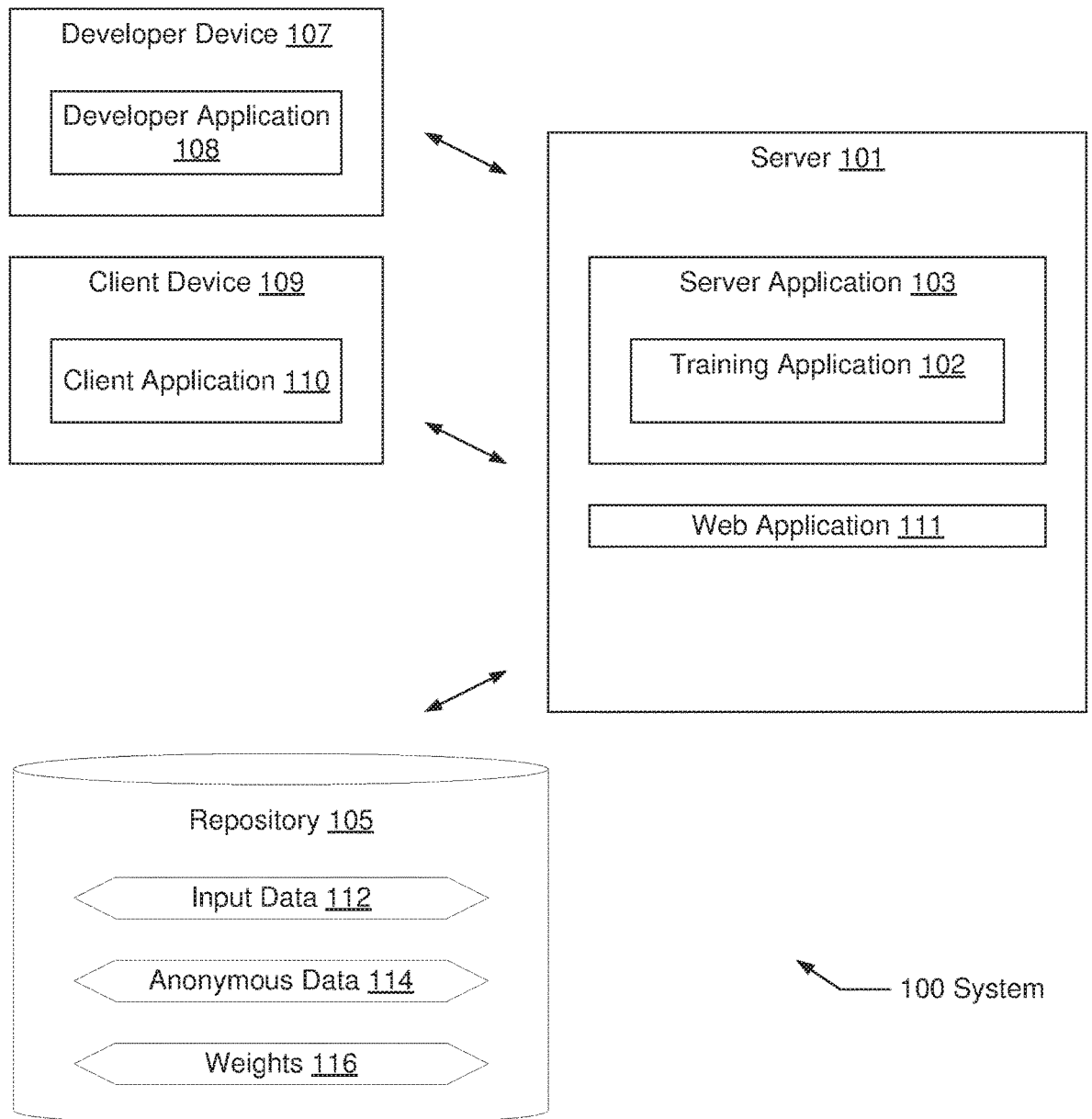

FIG. 1A, FIG. 1B, and FIG. 1C show diagrams of embodiments that are in accordance with the disclosure. FIG. 1A shows the server application (103), which preserves privacy by generating anonymous strings with RNNs. FIG. 1B shows the neural network model (128) with an RNN that generates anonymous strings. FIG. 1C shows the system (100), which preserves privacy using anonymous strings generated with RNNs. The embodiments of FIG. 1A, FIG. 1B, and FIG. 1C may be combined and may include or be included within the features and embodiments described in the other figures of the application. The features and elements of FIG. 1A, FIG. 1B, and FIG. 1C are, individually and as a combination, improvements to the technology of machine learning. The various elements, systems, and components shown in FIG. 1A, FIG. 1B, and FIG. 1C may be omitted, repeated, combined, and/or altered as shown from FIG. 1A, FIG. 1B, and FIG. 1C. Accordingly, the scope of the present disclosure should not be considered limited to the specific arrangements shown in FIG. 1A, FIG. 1B, and FIG. 1C.

Turning to FIG. 1A, the server application (103) transmits the anonymous data (114) generated with the neural network model (128) that is trained using the input data (112) that includes private information.

The server application (103) may generate the anonymous data (114) on demand in response to a request to generate anonymous data. The request may include a reference to the input data (112). The server application (103) may further generate and train the neural network model (128) on demand in response to the request identifying the input data (112). Additionally, either of the generation of the anonymous data (114) and training of the neural network model (128) may be performed prior to receiving the request and stored. The response time of the server application (103) may be reduced by using the stored versions of either the anonymous data (114) and the neural network model (128).

For requests that identify different sets of input data, the server application (103) may generate and train different neural network models that correspond to the different sets of input data. As an example, a first request may identify input data related to addresses and a second request may identify input data related to product names. Different neural network models may be trained for the different requests and the different neural network models generate different anonymous data that is based on the underlying structure of the different input data.

The server application (103) is a set of one or more programs executing on the server (101) (shown in FIG. 1C) that interacts with the client application (110) of the client device (109) (shown in FIG. 1C) and with the developer application (108) of the developer device (107) (shown in FIG. 1C). The server application (103) includes the anonymous data generator (122) and the training application (102).

The anonymous data generator (122) generates the anonymous data (114) using the neural network model (128). The anonymous data generator (122) includes the string generator (124) and the validation component (132). The anonymous data generator (122) generates prime characters, including the prime character (126). The prime characters may be randomly selected based on the frequency of starting characters in the strings in the input data (112). For example, if 20% of the strings in the input data start with the character "a", then there is a 20% probability that the prime character (126) is selected as the character "a". The prime characters are used by the string generator (124) to generate output strings, including the output string (130).

The string generator (124) generates the output string (130) from the prime character (126) using the neural network model (128). The prime character (126) is a seed character that starts the generation of the output string (130) with the neural network model (128). The neural network model is further described in relation to FIG. 1B.

The output string (130) is generated with the neural network model (128) from the prime character (126). The output string (130) may include invalid words. Invalid words are words from the input data that include private information. Examples of invalid words include addresses and names of people. As an example, if the input data is a set of transaction records of an account, the input data may include the names and locations of people and businesses that could be used to identify a user or account holder. For example, the invalid data may include the names of small businesses with which the user interacts.

The validation component (132) validates the output strings, including the output string (130). For the output string (130), the validation component may confirm that the output string (130) does not include invalid words by comparing the words in the output string (130) to a list of invalid words. The validation component (132) may generate the list of invalid words from the input data (112). Words in the input data (112) that occur with a frequency below a threshold may be identified as invalid words and added to the list of invalid words.

The anonymous data (114) is generated by the anonymous data generator (122) using the neural network model (128) trained with the input data (112). The anonymous data (114) does not include private information. The anonymous data may be generated on demand in response to a request received by the server application (103).

The training application (102) trains the machine learning models, including the neural network model (128), used by the system (100) (shown in FIG. 1C). The training application (102) is a set of one or more programs executing on the server (101) that may be invoked by the server application (103) to train the neural network model (128) with the input data (112). The neural network model (128) is further described in relation to FIG. 1B.

The input data (112) is data that contains private information. The input data (112) may include transaction records that include dates, payees, location information, and payment amounts in which the payees, the location information, and the payment amounts may be private information.

Turning to FIG. 1B, the neural network model (128) is trained by the training application (102) (of FIG. 1C) and used by the server application (103) (of FIG. 1C) to generate anonymous strings. The neural network model (128) includes an RNN. An RNN, also referred to as a recurrent network, is a type of artificial neural network where connections between nodes of the neural network form a directed graph along a temporal sequence. The directed graph along a temporal sequence allows an RNN to exhibit temporal dynamic behavior. Unlike feedforward neural networks, RNNs can use internal states stored in the nodes (i.e., using the weights as a form of memory) to process variable length sequences of inputs.

RNNs include two types: finite impulse and infinite impulse, which both exhibit temporal dynamic behavior. A finite impulse recurrent network is a directed acyclic graph that can be unrolled and replaced with a strictly feedforward neural network, while an infinite impulse recurrent network is a directed cyclic graph that cannot be unrolled.

Finite impulse and infinite impulse RNNs may have additional stored states, referred to as storage. The storage may be under direct control of the neural network and may be replaced by another network or graph that incorporates time delays or feedback loops. Controlled states are referred to as gated states or gated memory and are part of long short-term memory networks (LSTMs) and gated recurrent units (GRUs). An RNN may also be referred to as a feedback neural network.

Long short-term memory (LSTM) is an artificial RNN (RNN) architecture. Unlike standard feedforward neural networks, long short-term memory has feedback connections. Long short-term memory can not only process single data points (such as words or characters), but also entire sequences of data (such as sentences or paragraphs).

A long short-term memory unit in a neural network model may be composed of a cell that includes an input gate, an output gate, and a forget gate. The cell of the long short-term memory remembers values over arbitrary time intervals and the three gates regulate the flow of information into and out of the cell.

Long short-term memory networks may classify, process, and make predictions based on sequential data having lags of unknown duration between important events in a sequence. Long short-term memories deal with the exploding and vanishing gradient problems that can be encountered when training traditional RNNs.

Returning to the discussion of FIG. 1B, the neural network model (128) includes multiple layers (154), (158), (162), and (166). Additional layers and layers of different types may be used.

The layers (154), (158), (162), and (166) of the neural network model (128) are updated by the update component (170). The weights (116) (shown in FIG. 1C) are used by the layers (154), (158), (162), and (166) to generate the layer outputs (156), (160), (164), and (168) from the respective inputs. The layers (158) and (162) form part of an RNN.

The embedded layer (154) generates the embedded layer output (156) from the model input (152). The embedded layer (154) may be an embedding model using a continuous bag-of-words model or continuous skip-gram model to generate the embedded layer output as an embedded vector.

The model input (152) may be a one hot vector with as many dimensions as the number of different types of characters in the input data (112) (shown in FIG. 1C). For example, the input data may include 50 unique characters and the model input (152) would include 50 dimensions with a single dimension being "hot" (set to a value of 1) and the remaining dimensions being set to 0.

The embedded layer output (156) may have a different number of dimensions than the model input (152). For example, the embedded layer output (156) may have 100 dimensions.

The first recurrent layer (158) is an RNN that generates the first recurrent layer output (160) from the embedded layer output (156). The first recurrent layer (158) may be an LSTM layer that predicts the "next" character from a sequence of input characters encoded with the embedded layer (154). The first recurrent layer (158) may include 256 units that form a sequence of inputs received by the first recurrent layer (158) that influence the output of the first recurrent layer (158). Each of the units of the first recurrent layer (158) includes several weights that determine the outputs of the units, which determine the output of the first recurrent layer (158). The first recurrent layer output (160) may have the same number of dimensions as the embedded layer output (156).

The second recurrent layer (162) is another RNN that generates the second recurrent layer output (160) from the first recurrent layer output (160). The second recurrent layer (162) may be connected to the first recurrent layer (158) for the sequence of inputs for the second recurrent layer (162). The second recurrent layer output (164) may have the same number of units (e.g., 256 units) as the first recurrent layer (158). The second recurrent layer output (164) may have the same number of dimensions (e.g., 100) as the first recurrent layer output (160) and the embedded layer output (156).

The fully connected layer (166) generates the fully connected layer output (168) from the second recurrent layer output (164). The fully connected layer (166) is a fully connected layer in which each input node (a node represents a dimension of an input vector) is connected to each output node. For example, when the second recurrent layer output (164) is a 100 dimension vector and the fully connected layer output (168) is a 50 dimension vector (the same number of dimensions as the model input (152)), then the fully connected layer (166) would include 5000 weighted connections.

The update component (170) updates the neural network model (128). The update component (170) may use backpropagation to update the weights of the layers (154), (158), (162), and (166) of the neural network model (128). During training, the update component (170) compares the fully connected layer output (168) to an expected output using a loss function that identifies the difference between the output of the neural network model (128) and the expected output. The difference is then fed back into the layers of the neural network model (128) to update the weights of the neural network model (128).

Turning to FIG. 1C, the system (100) preserves privacy with synthetic string generation using RNNs. The system (100) includes the server (101), the repository (105), the developer device (107), and the client device (109). The server (101) may include the server application (103) and the web application (111).

The server application (103) includes multiple programs and machine learning models used by the system (101) to interact with the client device (109). The server application (103) includes the training application (102), as further described in FIG. 1A.

The training application (102) is a program on the server (101). The training application (102) trains the machine learning models of the system (101), including the neural network (128) (shown in FIG. 1B). Training the models of the system (100) updates the weights (116) stored in the repository (105). The training application (102) may be controlled by the server application (103) to train a new neural network model in response to a request for the anonymous data (114) that identifies the input data (112).

Figure 4A:
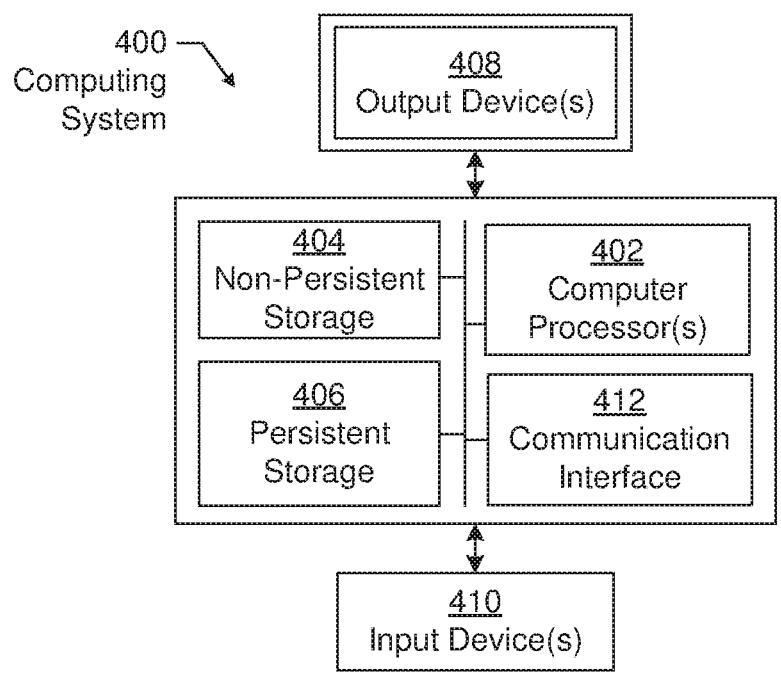
FIG. 4A and FIG. 4B show computing systems in accordance with disclosed embodiments.
Figure 4B:
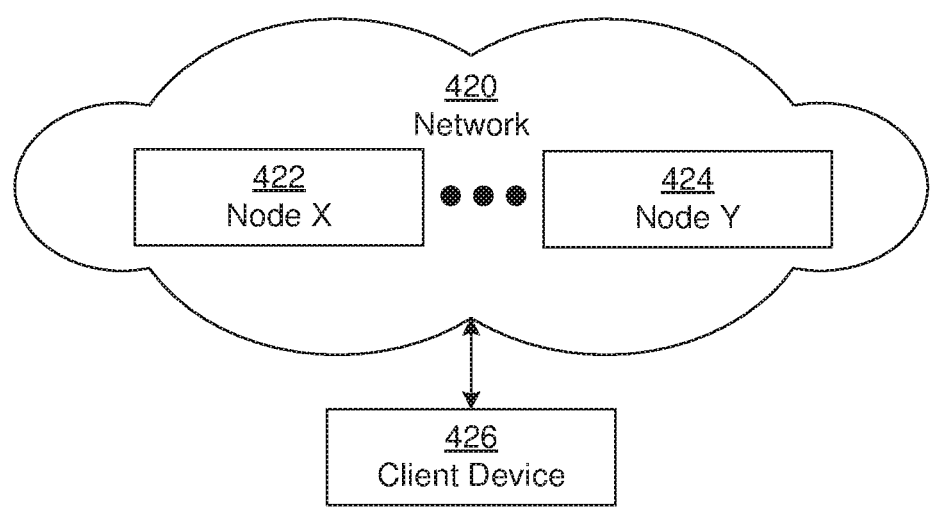

The server (101) is an embodiment of the computing system (400) and the nodes (422) and (424) of FIG. 4A and FIG. 4B. The server (101) may be one of a set of virtual machines hosted by a cloud services provider to deploy the server application (103) for a web provider.

The repository (105) is a computing system that may include multiple computing devices in accordance with the computing system (400) and the nodes (422) and (424) described below in FIGS. 4A and 4B. The repository (105) may be hosted by a cloud services provider for the web provider. The cloud services provider may provide hosting, virtualization, and data storage services as well as other cloud services and the web provider may operate and control the data, programs, and applications that store and retrieve data from the repository. The data in the repository (105) may include (shown in FIG. 1A) the prime character (126) and the output string (130); may include (shown in FIG. 1B) the model input (152), the embedded layer output (156), the recurrent layer outputs (160) and (164), and the fully connected layer output (168); and may include (shown in FIG. 1C) the input data (112), the anonymous data (114), and the weights (116).

The developer device (107) is an embodiment of the computing system (400) and the nodes (422) and (424) of FIG. 4A and FIG. 4B. The developer device (107) includes the developer application (108) for controlling and maintaining the server application (103). The developer application (108) may include a graphical user interface for interacting with an integrated development environment to maintain and control the server application (103).

The client device (109) is an embodiment of the computing system (400) and the nodes (422) and (424) of FIG. 4A and FIG. 4B. The client device (109) may be used by a designer of the web application (111) hosted by the system (100). The client device (109) includes the client application (110) that presents a user interface of an integrated development environment used to build the web application (111). The client application (110) may include multiple interfaces (e.g., a graphical user interface, a voice interface, etc.) for interacting with the server application (103). When testing the web application (111) with the client application (110), the system (100) uses the anonymous data (114) instead of the input data (112) to prevent the display of private information by the client application (110).

The developer application (108) and the client application (110) may be web browsers that access the server application (103) and the web application (111) using web pages hosted by the server (101). The developer application (108) and the client application (110) may additionally be web services that communicate with the server application (103) and the web application (111) using representational state transfer application programming interfaces (RESTful APIs). Although FIG. 1C shows a client server architecture, one or more parts of the training application (102) and the server application (103) may be local applications on the developer device (107) and the client device (109) without departing from the scope of the disclosure.

Figure 2:
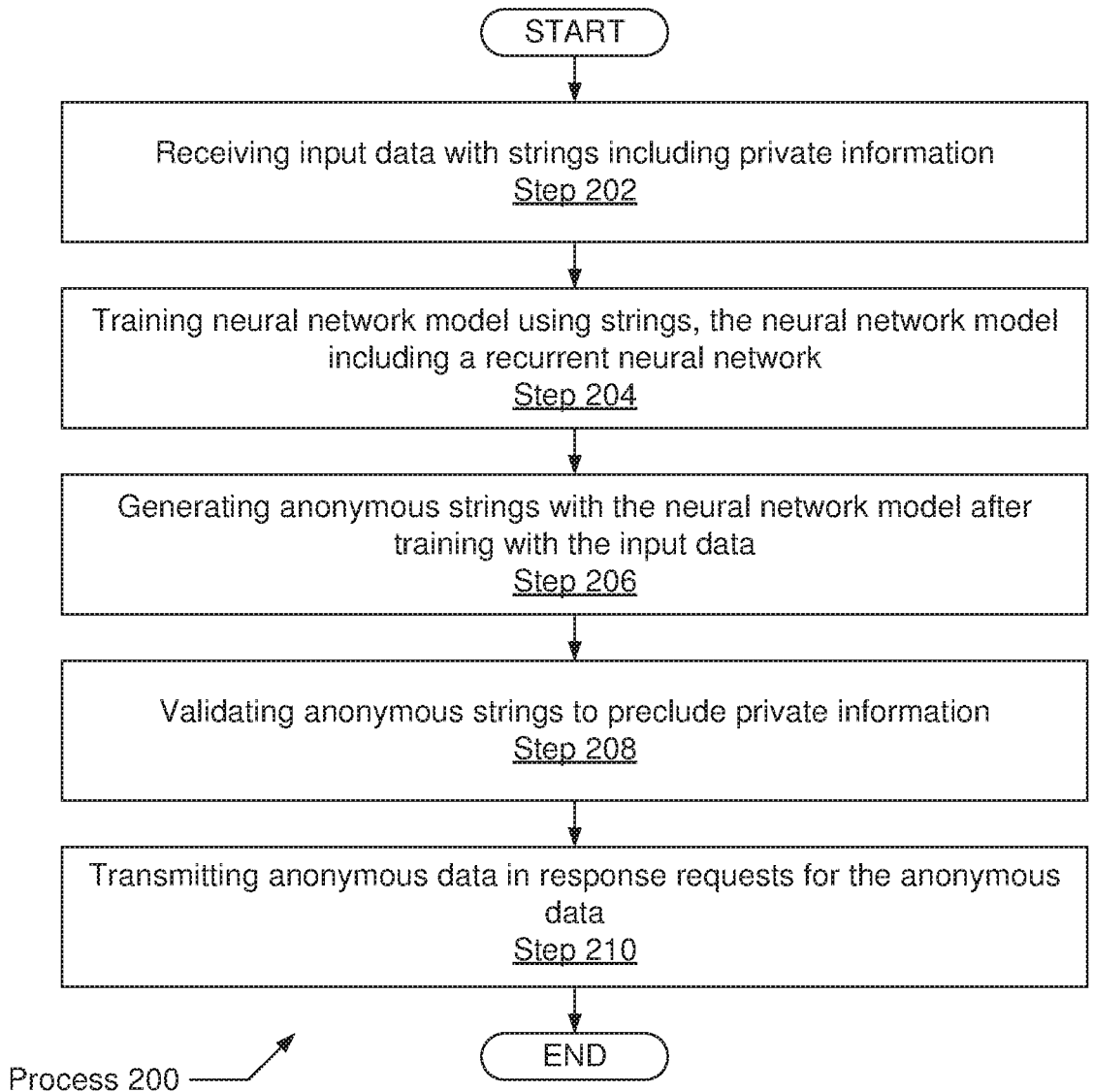
FIG. 2 shows a flowchart in accordance with disclosed embodiments.

FIG. 2 shows a flowchart of the process (200) in accordance with the disclosure. The process (200) of FIG. 2 preserves privacy with synthetic string generation using RNNs. The embodiment of FIG. 2 may be combined and may include or be included within the features and embodiments described in the other figures of the application. The features of FIG. 2 are, individually and as an ordered combination, improvements to the technology of computing systems and machine learning systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven. By way of an example, determination steps may not have a processor process an instruction unless an interrupt is received to signify that condition exists. As another example, determinations may be performed by performing a test, such as checking a data value to test whether the value is consistent with the tested condition.

Turning to FIG. 2, the process (200) generates anonymous data that is used to prevent the display of private information. The anonymous data is generated with an RNN that is trained on input data that includes private information. The anonymous data generated by the RNN may be similar to the input data in form, style, and structure but does not include private information from the input data.

In Step 202, input data is received that includes multiple strings. The input data may be stored in a repository. The strings include private information from which a user or account holder may be identified.

For example, the strings may include transaction strings. A transaction string may be a transaction record that includes a date, a payee, location information, and a payment amount. The private information includes the payee, the location information, and the payment amount from which an individual user or account holder may be identified. The numbers in the string (e.g., the payment amount) may be redacted or replaced (e.g., with the string "NUMBER") to further prevent private information from being presented. Different types of strings may be processed by the system, including product description strings that describe a product; address strings that identify addresses; comment strings that include a comment from an online forum posting. For each type of string, a different model may be generated and trained to generate anonymous data with a similar structure to the input and without private information. Examples of other types of strings include strings for items in an invoice, for business names, for names of people, etc.

In Step 204, a neural network model, which includes an RNN, is trained using the strings. The neural network model is trained by applying the layers of the neural network model to model inputs generated from the input data. As an example, a neural network model with an embedded layer, first and second recurrent layers, and a fully connected layer may be used. Additional recurrent layers, fully connected layers, and layers of other types may be used.

An embedded layer is applied to a model input to generate an embedded layer output. The embedded layer may receive as input a one hot encoded vector that identifies a character from a string from the input data. The output of the embedded layer is an embedded vector that includes information about the characters within a threshold number of characters of the character represented by the model input.

After the embedded layer, a first RNN layer is applied to the embedded layer output to generate a first recurrent layer output. The first RNN layer includes multiple units that utilize previous inputs to the first RNN layer to generate the first RNN layer output. The first RNN layer may be an LSTM layer.

After the first RNN layer, a second RNN layer is applied to the first recurrent layer output to generate a second recurrent layer output. The second RNN layer may have the same number of units as the first RNN layer. The outputs from each unit of the first RNN layer may be fed into the second RNN layer. The second RNN layer may be an LSTM layer.

After the second RNN layer, a fully connected layer is applied to the second recurrent layer output to generate a fully connected layer output. The output from the fully connected layer may have the same number of dimensions as the model input to the embedded layer and predict the next character in the string from which the model input was generated.

To train the neural network model, the weights of the neural network model are updated. The weights are updated by comparing a label character from the input string from which the model input is based to an output character generated by the neural network model from a set of characters from the input string. The set of characters precede the label character and the number of characters in the set of characters may be at least three. For example, the input string "withdrawal from checking" includes 24 characters (with spaces). Each character may be fed to the neural network for training with each subsequent character used as a label character for checking the output. Additionally, later characters may be used as the check character. As an example, the characters "w", "i", and "t" (i.e., the first three characters from the preceding string) may be fed into the neural network model and checked against the character "h" (the fourth character). Then the characters "i", "t", and "h" may be fed into the neural network model and checked against the character " " (the space character). To check against the label character, the label character is converted to one hot vector from which an embedded vector is generated. The fully connected layer output is compared to the label character embedded vector with a loss function that calculates the error between the fully connected layer output the label character embedded vector. The error from the loss function is then fed back into the neural network to update the weights of the neural network.

In Step 206, an anonymous string is generated with the neural network model after training the neural network model with the plurality of strings from the input data. The anonymous string may be generated using a prime character. The prime character is selected based on a frequency of the prime character in a start character of the strings from the input data.

In Step 208, the anonymous string is validated to preclude the private information from the anonymous string. Validation of the anonymous string confirms that the anonymous string does not include private information. If the anonymous string included private information, the validation would fail and the anonymous string would not be returned or used by the system.

To validate the anonymous string, a list of invalid terms may be used. The list of invalid terms is produced from the input data, which includes private information and from which the invalid terms are identified. Invalid terms may include terms that appear in the input data in less than a threshold percentage of the strings in the input data or less than a threshold number of times in the input data. The list of invalid words is generated to exclude common terms. For example, "amazon" (which may be a purchase from amazon.com), "checking", "savings", etc. are common terms that may not identify a particular user or account holder and may not be in the list of invalid terms. In contrast, the term "dr. elias" may be part of the list of invalid terms because the term "dr. elias" may identify a particular business or individual from which a user or account holder may be identified.

To perform the validation, string terms from the anonymous string (i.e., words and phrases form the anonymous string generated by the neural network model) are compared to invalid terms from the list of invalid terms. The anonymous string is validated when the anonymous string does not include the invalid terms from the list of invalid terms.

In Step 210, anonymous data is transmitted that includes the anonymous string and precludes the private information in response to a request for the anonymous data. The request for the anonymous data may identify the input data to be used as the basis for the anonymous data. If the system has already trained a network for the input data, then the system may use the trained model without retraining another model to generate the response to the request. If the system has already generated anonymous data for the input data with a trained model (i.e., generated and cached the anonymous data), then the system may respond to the request with the previously generated anonymous data.

FIG. 3A and FIG. 3B show examples of systems and interfaces in accordance with the disclosure. FIG. 3A shows a website that displays private information. FIG. 3B shows an updated website that displays anonymous data. The embodiments of FIG. 3A and FIG. 3B may be combined and may include or be included within the features and embodiments described in the other figures of the application. The features and elements of FIG. 3A and FIG. 3B are, individually and as a combination, improvements to the technology of computing systems and machine learning systems. The various features, elements, widgets, components, and interfaces shown in FIG. 3A and FIG. 3B may be omitted, repeated, combined, and/or altered as shown. Accordingly, the scope of the present disclosure should not be considered limited to the specific arrangements shown in FIG. 3A and FIG. 3B.

Turning to FIG. 3A, a mockup of a user interface (300) is shown, which may be displayed on a device. The user interface (300) is a rendering of a web page in a web browser running on the device. The user interface (300) includes the header (302), the sidebar (304), the footer (306), and the listing (308). The header (302), the sidebar (304), and the footer (306) may include additional user interface elements for a user to interact with the user interface (300).

The listing (308) displays strings of transaction records that include private information. For example, the string "Withdrawal @ DRS. ELIAS & OAK 63 EAST THIRD STREET" identifies a particular doctor and address, which is private information that could be used to identify the user or account holder associated with the transactions. The strings shown in the list (308) may be part of a set of input data.

Turning to FIG. 3B, the user interface (320) is being designed and tested as an update to the user interface (300) from FIG. 3A. The user interface (320) includes the header (322) and the footer (326) from the user interface (300) from FIG. 3A.

The sidebar (324) and the list (328) are updated. The sidebar (324) is in a different position relative to the list (328) and may include additional differences in the number and types of user interface elements being used.

The list (328) is updated to use a different symbol to mark each entry of the list (328). Additionally, instead of including strings from actual transaction records with private information, the list (328) is filled with anonymous data generated by an RNN. Using the anonymous data prevents the designer of the user interface (320) from viewing private information that could be used to identify the account holder while still allowing the designer of the user interface (320) to see and experience an approximation of the look and feel for the updated user interface (320).

The anonymous data in the list (328) is generated in response to a request that identifies input data that includes the strings from the list (308) of FIG. 3A. A neural network model that includes an RNN is trained on the input data and then used to generate the anonymous data presented in the list (328).

Embodiments of the invention may be implemented on a computing system. Any combination of mobile, desktop, server, router, switch, embedded device, or other types of hardware may be used. For example, as shown in FIG. 4A, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system shown in FIG. 4A, or a group of nodes combined may correspond to the computing system shown in FIG. 4A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (400) may be located at a remote location and connected to the other elements over a network.

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4A. Further, the client device (426) may include and/or perform all or a portion of one or more embodiments of the invention.

The computing system or group of computing systems described in FIGS. 4A and 4B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hypertext Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 4A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail, such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 4A, while performing one or more embodiments of the invention, may perform data comparison. Data comparison may be used to compare two or more data values (e.g., A, B). For example, one or more embodiments may determine whether $A>B$, $A=B$, $A!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 4A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 4A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 4A and the nodes and/or client device in FIG. 4B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
obtaining, from a physical storage device, training data comprising a plurality of training strings comprising private information;
training a recurrent neural network (RNN) model with the plurality of training strings to predict a next character in a training string, to obtain a trained RNN model, wherein training the RNN model comprises:
applying an embedded layer to the training data to generate an embedded layer output, wherein the embedded layer receives as input an encoded vector that represents a character from a string from the training data, wherein the embedded layer output is an embedded vector that includes information about the character within a threshold number of characters of the character represented by the encoded vector,
applying a plurality of RNN layers to the embedded layer output to generate a recurrent layer output, wherein the recurrent layer output predicts a next character from a sequence of input characters encoded with the embedded layer,
applying a fully connected layer to the recurrent layer output to generate a fully connected layer output, wherein the fully connected layer output predicts the next character in the string from the training data that is inputted to the RNN, and
comparing the fully connected layer output to an expected output using a loss function that identifies a difference between an output of the RNN model and the expected output, wherein the difference is then fed back into the plurality of RNN layers of the RNN model to update weights of the RNN model;
receiving a request to generate an anonymous string from a plurality of input strings comprising private information;
selecting a prime character randomly based on a frequency of the prime character as a starting character in the plurality of input strings;
processing, by the trained RNN model, the selected prime character to generate the anonymous string, wherein the prime character is used as the starting character for each of the plurality of input strings, wherein the prime character is a seed character that starts a generation of an output string with the RNN model;
generating a list of invalid terms from the private information corresponding to the plurality of input strings;
comparing at least one string term from the anonymous string to the list of invalid terms;
validating the anonymous string responsive to the anonymous string precluding the list of invalid terms to obtain a validated anonymous string; and
transmitting the validated anonymous string in response to the request for the anonymous string.

2. The method of claim 1, further comprising:
training the RNN model, wherein the RNN model includes a long short term memory (LSTM) layer.

3. The method of claim 1, further comprising:
training the RNN model by comparing a label character from an input string of the plurality of training strings to an output character generated by the RNN model from a set of characters from the input string, wherein the set of characters precede the label character in the input string, and wherein a number of characters in the set of characters is at least three.

4. The method of claim 1, further comprising:
generating the list of invalid terms to exclude common terms.

5. The method of claim 1, further comprising:
receiving the training data, wherein the plurality of training strings comprises a transaction string that comprises a transaction record that includes a date, a payee, location information, and a payment amount, and wherein the private information includes one or more of the payee, the location information, and the payment amount.

6. A system comprising:
a processor;
a memory coupled to the processor;
a physical storage device;
the memory comprising an application, wherein the application executes on the processor, uses the memory, and is configured for:
obtaining, from the physical storage device, training data comprising a plurality of training strings comprising private information;
training a recurrent neural network (RNN) model with the plurality of training strings to predict a next character in a training string, to obtain a trained RNN model, wherein training the RNN model comprises:
applying an embedded layer to the training data to generate an embedded layer output, wherein the embedded layer receives as input an encoded vector that represents a character from a string from the training data, wherein the embedded layer output is an embedded vector that includes information about the character within a threshold number of characters of the character represented by the encoded vector, applying a plurality of RNN layers to the embedded layer output to generate a recurrent layer output, wherein the recurrent layer output predicts a next character from a sequence of input characters encoded with the embedded layer, applying a fully connected layer to the recurrent layer output to generate a fully connected layer output, wherein the fully connected layer output predicts the next character in the string from the training data that is inputted to the RNN, and comparing the fully connected layer output to an expected output using a loss function that identifies a difference between an output of the RNN model and the expected output, wherein the difference is then fed back into the plurality of RNN layers of the RNN model to update weights of the RNN model;

receiving a request to generate an anonymous string from a plurality of input strings comprising private information;

selecting a prime character randomly based on a frequency of the prime character as a starting character in the plurality of input strings;

processing, by the trained RNN model, the selected prime character to generate the anonymous string, wherein the prime character is used as the starting character for each of the plurality of input strings, wherein the prime character is a seed character that starts a generation of an output string with the RNN model;

generating a list of invalid terms from the private information corresponding to the plurality of input strings;

comparing at least one string term from the anonymous string to the list of invalid terms;

validating the anonymous string responsive to the anonymous string precluding the list of invalid terms to obtain a validated anonymous string; and transmitting the validated anonymous string in response to the request for the anonymous string.

7. The system of claim 6, wherein the application is further configured for:
training the RNN model, wherein the RNN model includes a long short term memory (LSTM) layer.

8. The system of claim 6, wherein the application is further configured for:
training the RNN model by comparing a label character from an input string of the plurality of training strings to an output character generated by the RNN model from a set of characters from the input string, wherein the set of characters precede the label character in the input string, and wherein a number of characters in the set of characters is at least three.

9. The system of claim 6, wherein the application is further configured for:
generating the list of invalid terms to exclude common terms.

10. The system of claim 6, wherein the application is further configured for:
receiving the training data, wherein the plurality of training strings comprises a transaction string that comprises a transaction record that includes a date, a payee, location information, and a payment amount, and wherein the private information includes one or more of the payee, the location information, and the payment amount.

11. A set of one or more non-transitory computer readable mediums comprising computer readable program code for:
obtaining, from a physical storage device, training data comprising a plurality of training strings comprising private information;
training a recurrent neural network (RNN) model with the plurality of training strings to predict a next character in a training string, to obtain a trained RNN model, wherein training the RNN model comprises:
applying an embedded layer to the training data to generate an embedded layer output, wherein the embedded layer receives as input an encoded vector that represents a character from a string from the training data, wherein the embedded layer output is an embedded vector that includes information about the character within a threshold number of characters of the character represented by the encoded vector,
applying a plurality of RNN layers to the embedded layer output to generate a recurrent layer output, wherein the recurrent layer output predicts a next character from a sequence of input characters encoded with the embedded layer,
applying a fully connected layer to the recurrent layer output to generate a fully connected layer output, wherein the fully connected layer output predicts the next character in the string from the training data that is inputted to the RNN, and
comparing the fully connected layer output to an expected output using a loss function that identifies a difference between the an output of the RNN model and the expected output, wherein the difference is then fed back into the plurality of RNN layers of the RNN model to update weights of the RNN model;
receiving a request to generate an anonymous string from a plurality of input strings comprising private information;
selecting a prime character randomly based on a frequency of the prime character as a starting character in the plurality of input strings;
processing, by the trained RNN model, the selected prime character to generate the anonymous string, wherein the prime character is used as the starting character for each of the plurality of input strings, wherein the prime character is a seed character that starts a generation of an output string with the RNN model;
generating a list of invalid terms from the private information corresponding to the plurality of input strings;
comparing at least one string term from the anonymous string to the list of invalid terms;
validating the anonymous string responsive to the anonymous string precluding the list of invalid terms to obtain a validated anonymous string; and
transmitting the validated anonymous string in response to the request for the anonymous string.

12. The set of one or more non-transitory computer readable mediums of claim 11, further comprising computer readable program code for:
training the RNN model, wherein the RNN model includes a long short term memory (LSTM) layer.

* * * * *